US012643669B1

(12) United States Patent
Kupratis et al.

(10) Patent No.: US 12,643,669 B1
(45) Date of Patent: Jun. 2, 2026

(54) AIRCRAFT PROPULSION SYSTEM WITH CORE FLOWPATH INLET FORWARD OF FAN ROTOR

(71) Applicant: RTX Corporation, Farmington, CT (US)

(72) Inventors: Daniel B. Kupratis, Wallingford, CT (US); Paul R. Hanrahan, Sedona, AZ (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/079,719

(22) Filed: Mar. 14, 2025

(51) Int. Cl.
| | |
|---|---|
| *B64D 27/40* | (2024.01) |
| *B64D 27/14* | (2006.01) |
| *F02C 7/04* | (2006.01) |
| *F02C 7/20* | (2006.01) |
| *F02C 9/18* | (2006.01) |

(52) U.S. Cl.
CPC ........... *B64D 27/402* (2024.01); *B64D 27/14* (2013.01); *F02C 7/04* (2013.01); *F02C 7/20* (2013.01); *F02C 9/18* (2013.01)

(58) Field of Classification Search
CPC ....... B64C 39/10; B64C 39/105; B64C 21/01; B64D 27/10; B64D 27/12; B64D 27/14; B64D 27/16; B64D 27/18; B64D 27/20; F02K 3/062; F02K 3/077; F02K 3/068; F02K 3/075; F02K 3/065
See application file for complete search history.

(56) References Cited

U.S. PATENT DOCUMENTS

| | | | | |
|---|---|---|---|---|
| 6,527,224 | B2 | 3/2003 | Seidel | |
| 7,216,475 | B2 * | 5/2007 | Johnson | F02K 3/077 |
| | | | | 60/262 |
| 7,246,484 | B2 * | 7/2007 | Giffin, III | F02K 3/077 |
| | | | | 60/226.3 |
| 8,161,728 | B2 * | 4/2012 | Kupratis | F02K 3/077 |
| | | | | 60/268 |
| 8,695,324 | B2 * | 4/2014 | Giffin | F02K 3/077 |
| | | | | 60/226.3 |
| 9,611,039 | B2 * | 4/2017 | Lieven | B64D 9/00 |
| 11,448,131 | B2 * | 9/2022 | Rambo | F02K 3/075 |
| 11,772,771 | B2 * | 10/2023 | Lazzara | B64D 29/02 |
| | | | | 244/130 |
| 11,846,249 | B1 * | 12/2023 | Paulino | F02C 9/18 |
| 11,926,410 | B2 * | 3/2024 | Page | B64D 27/20 |

(Continued)

*Primary Examiner* — Arfan Y. Sinaki
(74) *Attorney, Agent, or Firm* — Getz Balich LLC

(57) ABSTRACT

An aircraft system includes a propulsion system mounted to an airframe. The propulsion system includes a fan rotor, an engine core, an outer housing structure, an inner housing structure, a bypass flowpath and a core flowpath. The engine core is configured to drive rotation of the fan rotor about an axis. The engine core includes a compressor section, a combustor section and a turbine section. The outer housing structure houses the fan rotor and forms an outer peripheral boundary of the bypass flowpath. The inner housing structure forms an inner peripheral boundary of the bypass flowpath. The core flowpath includes a core inlet and a core exhaust. The core flowpath extends longitudinally through the compressor section, the combustor section and the turbine section from the core inlet to the core exhaust. The core inlet is located axially forward of the fan rotor and radially between the axis and the airframe.

19 Claims, 6 Drawing Sheets

(56)            References Cited

U.S. PATENT DOCUMENTS

| | | | |
|---|---|---|---|
| 11,975,819 B2 * | 5/2024 | Page | B64C 21/06 |
| 2011/0171007 A1 * | 7/2011 | Johnson | F02C 9/18 |
| | | | 415/145 |
| 2015/0021442 A1 * | 1/2015 | Hunter | B64C 1/0009 |
| | | | 244/53 R |
| 2020/0332718 A1 * | 10/2020 | Rambo | F02C 7/18 |

* cited by examiner

AIRCRAFT PROPULSION SYSTEM WITH CORE FLOWPATH INLET FORWARD OF FAN ROTOR

BACKGROUND OF THE DISCLOSURE

1. Technical Field

This disclosure relates generally to an aircraft and, more particularly, to a propulsion system for the aircraft.

2. Background Information

Various propulsion system arrangements for an aircraft are known in the art. While these known aircraft propulsion system arrangements have various benefits, there is still room in the art for improvement.

SUMMARY OF THE DISCLOSURE

According to an aspect of the present disclosure, a system is provided for an aircraft. This system includes an airframe and a propulsion system mounted to the airframe. The propulsion system extends axially along an axis from a forward end of the propulsion system to an aft end of the propulsion system. The propulsion system includes a fan rotor, an engine core, an outer housing structure, an inner housing structure, a bypass flowpath and a core flowpath. The fan rotor is configured to propel air through the bypass flowpath. The engine core is configured to drive rotation of the fan rotor about the axis. The engine core includes a compressor section, a combustor section and a turbine section. The outer housing structure houses the fan rotor and forms an outer peripheral boundary of the bypass flowpath. The inner housing structure houses the engine core and forms an inner peripheral boundary of the bypass flowpath. The core flowpath includes a core inlet and a core exhaust. The core flowpath extends longitudinally through the compressor section, the combustor section and the turbine section from the core inlet to the core exhaust. The core inlet is located axially forward of the fan rotor and radially between the axis and the airframe.

According to another aspect of the present disclosure, an aircraft system includes a propulsion system extending axially along an axis from a forward end of the propulsion system to an aft end of the propulsion system. The propulsion system includes a fan rotor, an engine core, an outer housing structure, an inner housing structure, an inlet flowpath, a bypass flowpath and a core flowpath. The fan rotor is configured to propel air through the bypass flowpath. The engine core is configured to drive rotation of the fan rotor about the axis. The engine core includes a compressor section, a combustor section and a turbine section. The outer housing structure houses the fan rotor. The outer housing structure is disposed radially outboard of and extends axially along the inlet flowpath and the bypass flowpath. The inner housing structure houses the engine core. The inner housing structure is disposed radially inboard of and extends axially along the bypass flowpath. The inlet flowpath projects longitudinally into the propulsion system from an airflow inlet into the propulsion system. The inlet flowpath is fluidly coupled with and upstream of the bypass flowpath and the core flowpath. The core flowpath includes a core inlet and a core exhaust. The core flowpath extends longitudinally through the compressor section, the combustor section and the turbine section from the core inlet to the core exhaust. The core inlet is located axially forward of the fan rotor.

According to still another aspect of the present disclosure, an aircraft system includes a propulsion system extending axially along an axis from a forward end of the propulsion system to an aft end of the propulsion system. The propulsion system includes a fan rotor, an engine core, an outer housing structure, an inner housing structure, a first bypass flowpath, a second bypass flowpath and a core flowpath. The fan rotor is configured to propel air through the first bypass flowpath and the second bypass flowpath. The engine core is configured to drive rotation of the fan rotor about the axis. The engine core includes a compressor section, a combustor section and a turbine section. The outer housing structure houses the fan rotor and forms an outer peripheral boundary of the first bypass flowpath. The inner housing structure houses the engine core and forms an inner peripheral boundary of the first bypass flowpath. An airflow inlet into the second bypass flowpath and an airflow outlet from the second bypass flowpath are fluidly coupled to the first bypass flowpath. The core flowpath extends through the compressor section, the combustor section and the turbine section.

The propulsion system may also include an inlet flowpath upstream of the fan rotor. The first bypass flowpath and the core flowpath may be downstream of and fluidly coupled in parallel to the inlet flowpath.

The aircraft system may also include a pylon structure projecting out from the propulsion system. The core inlet may be disposed radially between the axis and the pylon structure.

The aircraft system may also include a pylon structure projecting out from the propulsion system. The axis may be disposed radially between the core inlet and the pylon structure.

The system may also include a pylon structure mounting the propulsion system to the airframe. The core inlet may be circumferentially aligned with the pylon structure.

The propulsion system may be spaced from the airframe by an open volume formed by an exterior surface of the airframe and an exterior surface of the outer housing structure. The open volume may axially and/or circumferentially overlap the core inlet.

The propulsion system may be spaced from the airframe by an open volume formed by: an exterior surface of the airframe and an exterior surface of the outer housing structure; and the core inlet circumferentially aligned with the open volume.

An upstream section of the core flowpath may project longitudinally to the core inlet and may be formed by the outer housing structure.

The core inlet may be axially aligned with an airflow inlet into the bypass flowpath.

The propulsion system may also include an inlet flowpath. The inlet flowpath may project longitudinally into the aircraft propulsion system from an airflow inlet into the propulsion system at the forward end of the propulsion system. The inlet flowpath may be fluidly coupled with and may be upstream of the core inlet and an airflow inlet into the bypass flowpath.

The propulsion system may also include an inlet flowpath. The inlet flowpath may project longitudinally into the aircraft propulsion system to the core inlet and an airflow inlet into the bypass flowpath.

The core flowpath may include: an upstream section projecting longitudinally to the core inlet and disposed radially outboard of the bypass flowpath; a downstream section projecting longitudinally to the core exhaust and disposed radially inboard of the bypass flowpath; and an intermediate section fluidly coupling the upstream section to the downstream section. The intermediate section may extend radially across the bypass flowpath.

A trajectory of the core flowpath, longitudinally from the core inlet to the core exhaust, may axially reverse direction one or more times upstream of the compressor section.

The bypass flowpath may be a first bypass flowpath. The propulsion system may also include a second bypass flowpath. An airflow inlet into the second bypass flowpath may be fluidly coupled to the core flowpath upstream of the compressor section.

The bypass flowpath may be a first bypass flowpath. The propulsion system may also include a second bypass flowpath. An airflow inlet into the second bypass flowpath may be fluidly coupled to the core flowpath at a location radially outboard of the first bypass flowpath.

The bypass flowpath may be a first bypass flowpath. The propulsion system may also include a second bypass flowpath. An airflow inlet into the second bypass flowpath may be fluidly coupled to the core flowpath. An airflow outlet from the second bypass flowpath may be fluidly coupled to the first bypass flowpath.

The bypass flowpath may be a first bypass flowpath. The propulsion system may also include a second bypass flowpath. The second bypass flowpath may be fluidly discrete from the core flowpath and may be disposed radially inboard of the first bypass flowpath.

An airflow inlet into the second bypass flowpath may be axially next to and downstream of the fan rotor.

The bypass flowpath may be a first bypass flowpath. The propulsion system may also include a second bypass flowpath. An airflow inlet into the second bypass flowpath and an airflow outlet from the second bypass flowpath may be fluidly coupled to the first bypass flowpath.

The bypass flowpath may be a first bypass flowpath. The propulsion system may also include a second bypass flowpath and a plurality of vanes. The second bypass flowpath may be fluidly discrete from the core flowpath. The vanes may be arranged circumferentially about the axis and may extend radially across the second bypass flowpath.

The airframe may include a first wing, a second wing and a fuselage disposed laterally between the first wing and the second wing. The propulsion system may be mounted to the fuselage.

The airframe may be configured as a blended wing body airframe. The propulsion system may be mounted to a vertical top of the blended wing body airframe.

The present disclosure may include any one or more of the individual features disclosed above and/or below alone or in any combination thereof.

The foregoing features and the operation of the invention will become more apparent in light of the following description and the accompanying drawings.

4

Figure 6:
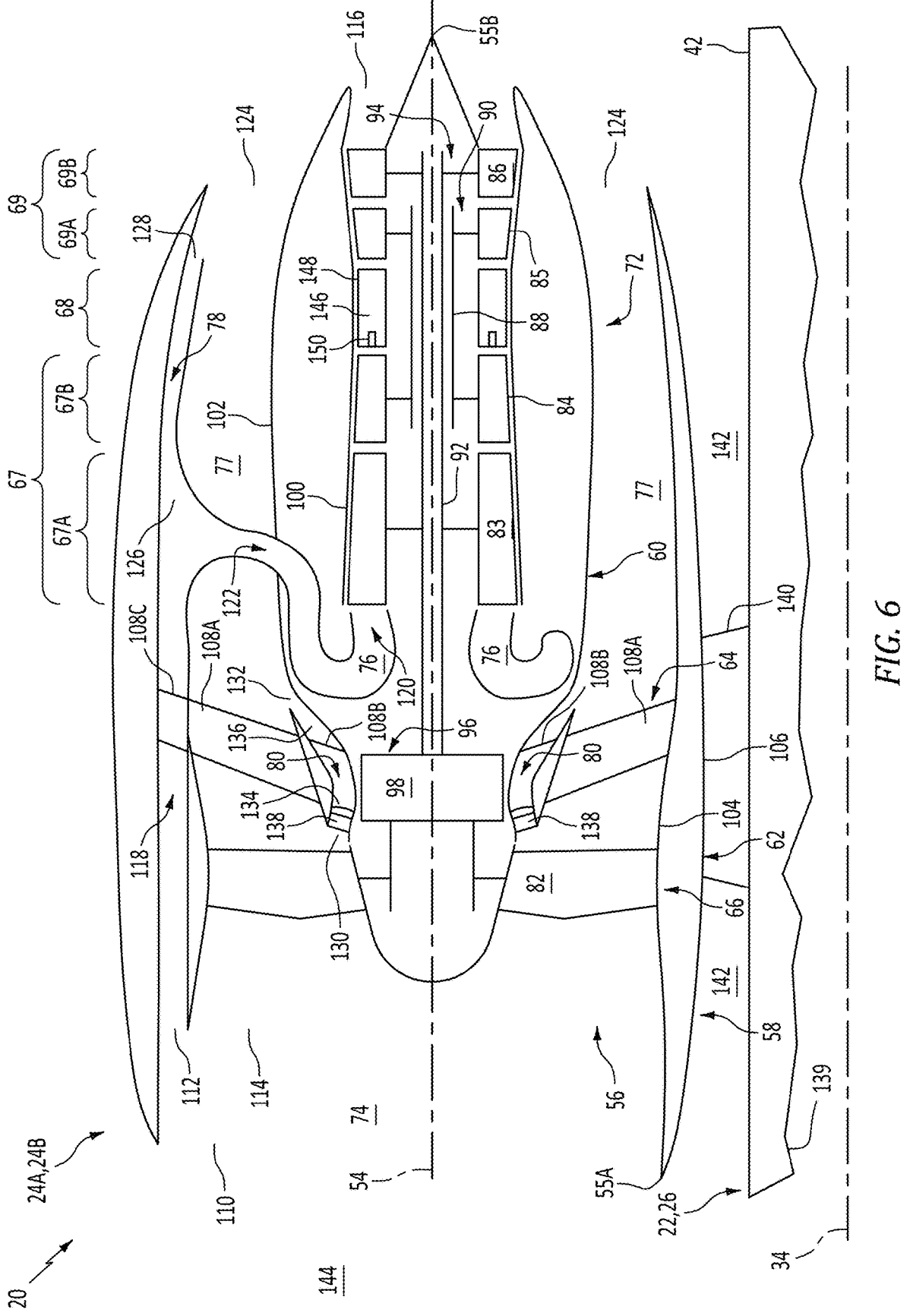

FIG. 6 is a schematic side sectional illustration of another propulsion system mounted to a portion of the aircraft airframe.

DETAILED DESCRIPTION

Figure 1:
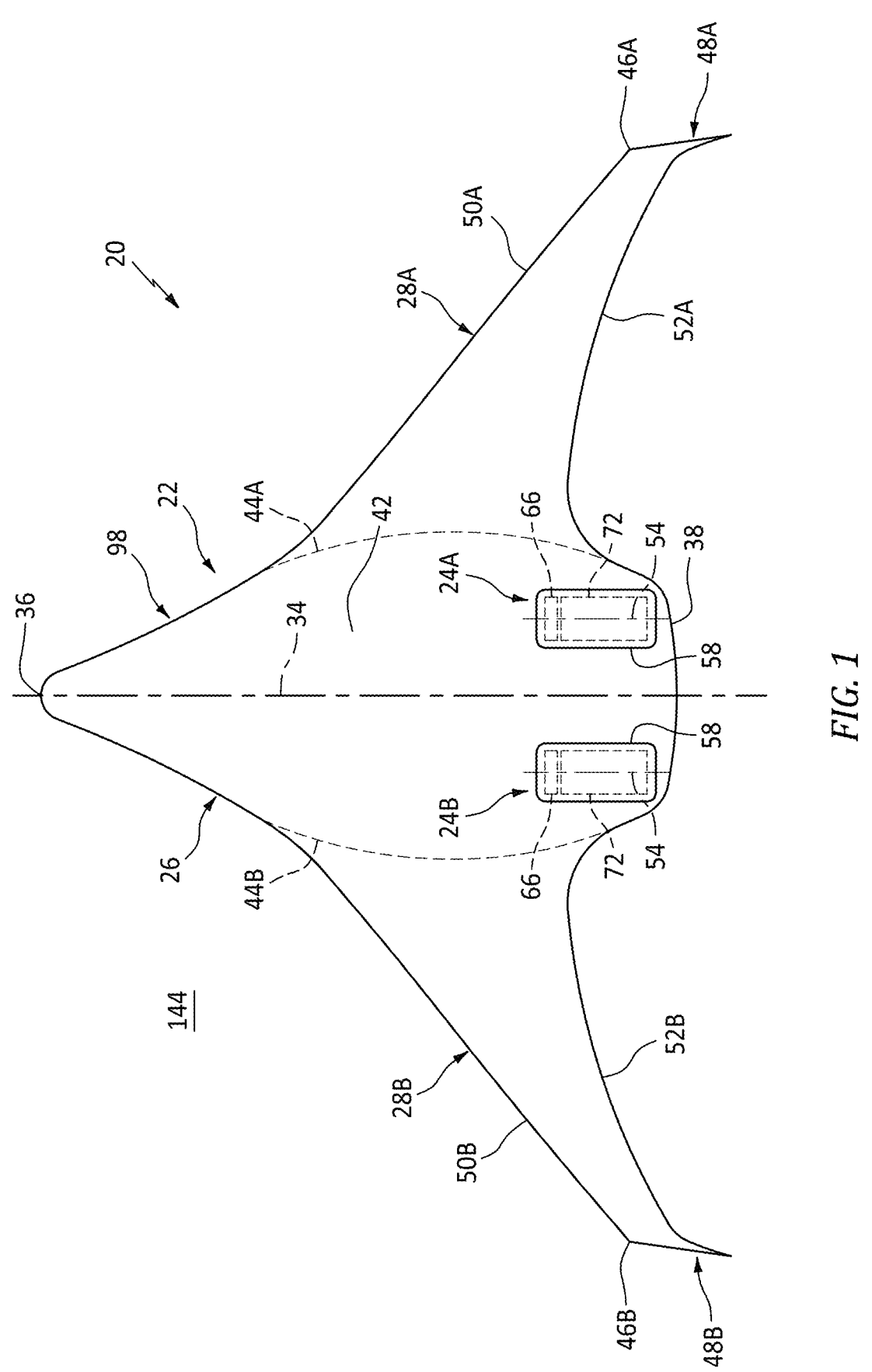
FIG. 1 is a plan view illustration of an aircraft.

FIG. 1 illustrates a blended wing body (BWB) aircraft 20. This BWB aircraft 20 includes an airframe 22 and one or more propulsion systems 24A and 24B (generally referred to as "24"). The aircraft airframe 22 includes a body 26 (e.g., a fuselage) and one or more wings 28A and 28B (generally referred to as "28").

Figure 2:
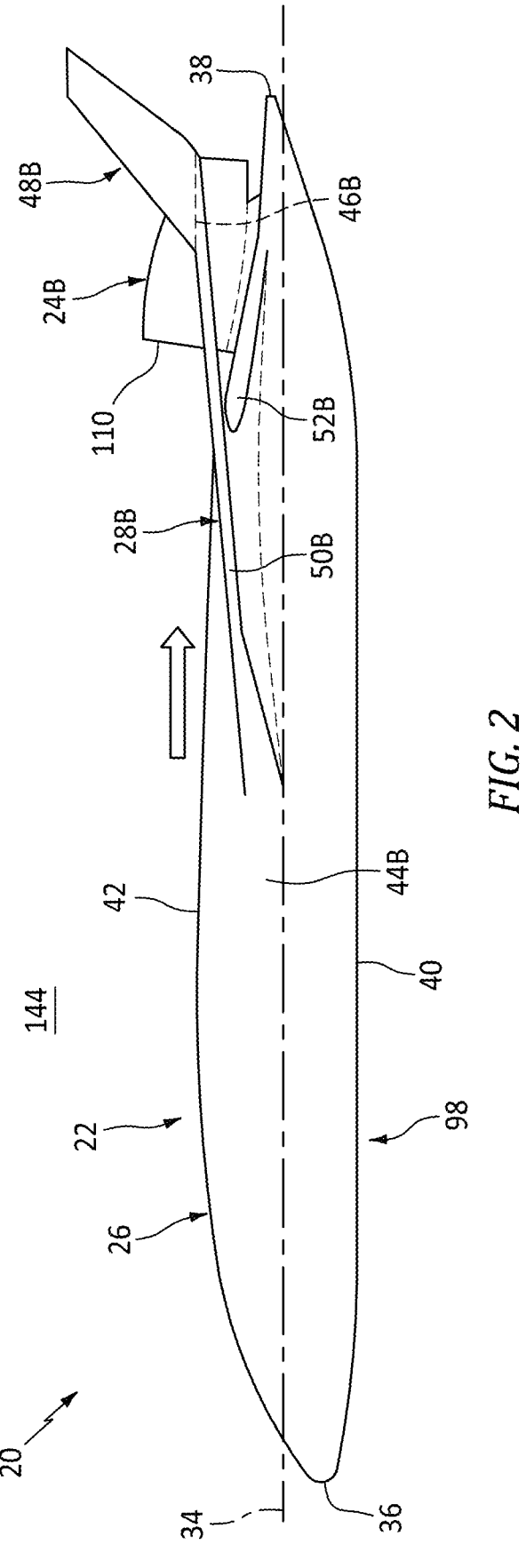
FIG. 2 is a side view illustration of the aircraft.
Figure 3:
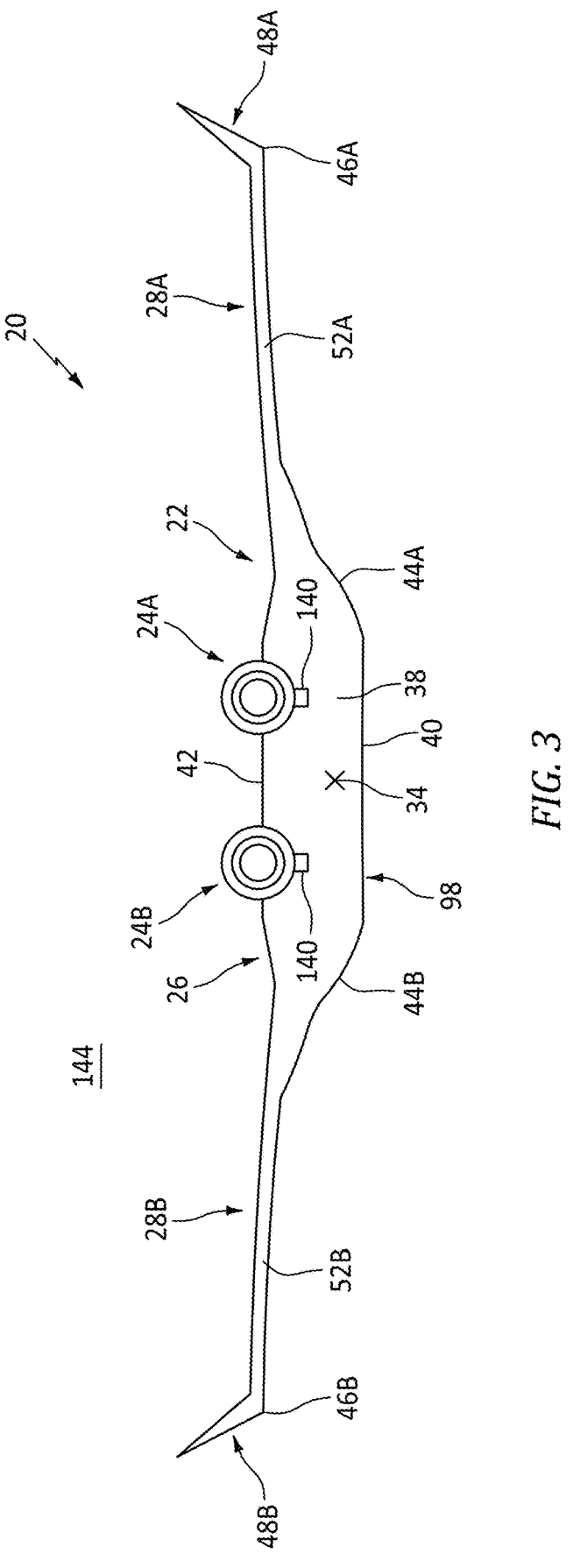
FIG. 3 is a rear end view illustration of the aircraft.

The aircraft body 26 of FIG. 1 extends lengthwise along a centerline 34 between and to an upstream, forward end 36 (e.g., a tip end) of the aircraft body 26 and a downstream, aft end 38 (e.g., a tail end) of the aircraft body 26. This centerline 34 may be a centerline axis of the BWB aircraft 20, the aircraft airframe 22 and/or the aircraft body 26. Referring to FIG. 2, the centerline 34 may be substantially (e.g., within +/–five or ten degrees) or completely parallel with a horizon line when, for example, the BWB aircraft 20 is on ground and/or flying in level flight. The aircraft body 26 extends vertically between and to opposing vertical bottom and top sides 40 and 42 of the aircraft body 26. The body bottom side 40 is vertically below the body top side 42 with respect to a gravitational direction when, for example, the BWB aircraft 20 is on the ground and/or flying in level flight. Referring to FIGS. 1 and 3, the aircraft body 26 extends laterally between and to opposing lateral sides 44A and 44B (generally referred to as "44") of the aircraft body 26.

The aircraft wings 28A and 28B of FIGS. 1 and 3 are arranged to the opposing lateral sides 44A and 44B of the aircraft body 26. Each of the aircraft wings 28 is connected to (e.g., fixed to) the aircraft body 26. Each of the aircraft wings 28 projects spanwise along a span line of the respective aircraft wing 28A, 28B out from the aircraft body 26, at the respective body lateral side 44A, 44B, to a distal tip 46A, 46B of the respective aircraft wing 28A, 28B. At the wing tip 46A, 46B, the respective aircraft wing 28A, 28B may (or may not) be configured with a winglet 48A, 48B. Each of the aircraft wings 28 of FIG. 1 extends along a mean line of the respective aircraft wing 28A, 28B from a leading edge 50A, 50B of the respective aircraft wing 28A, 28B to a trailing edge 52A, 52B of the respective aircraft wing 28A, 28B. The wing leading edge 50A, 50B of FIG. 1, at a base of the respective aircraft wing 28A, 28B, is spaced aft, downstream from the body forward end 36. The wing trailing edge 52A, 52B of FIG. 1, at the wing base, is spaced forward, upstream from the body aft end 38. The present disclosure, however, is not limited to such an exemplary aircraft wing arrangement.

Figure 4:
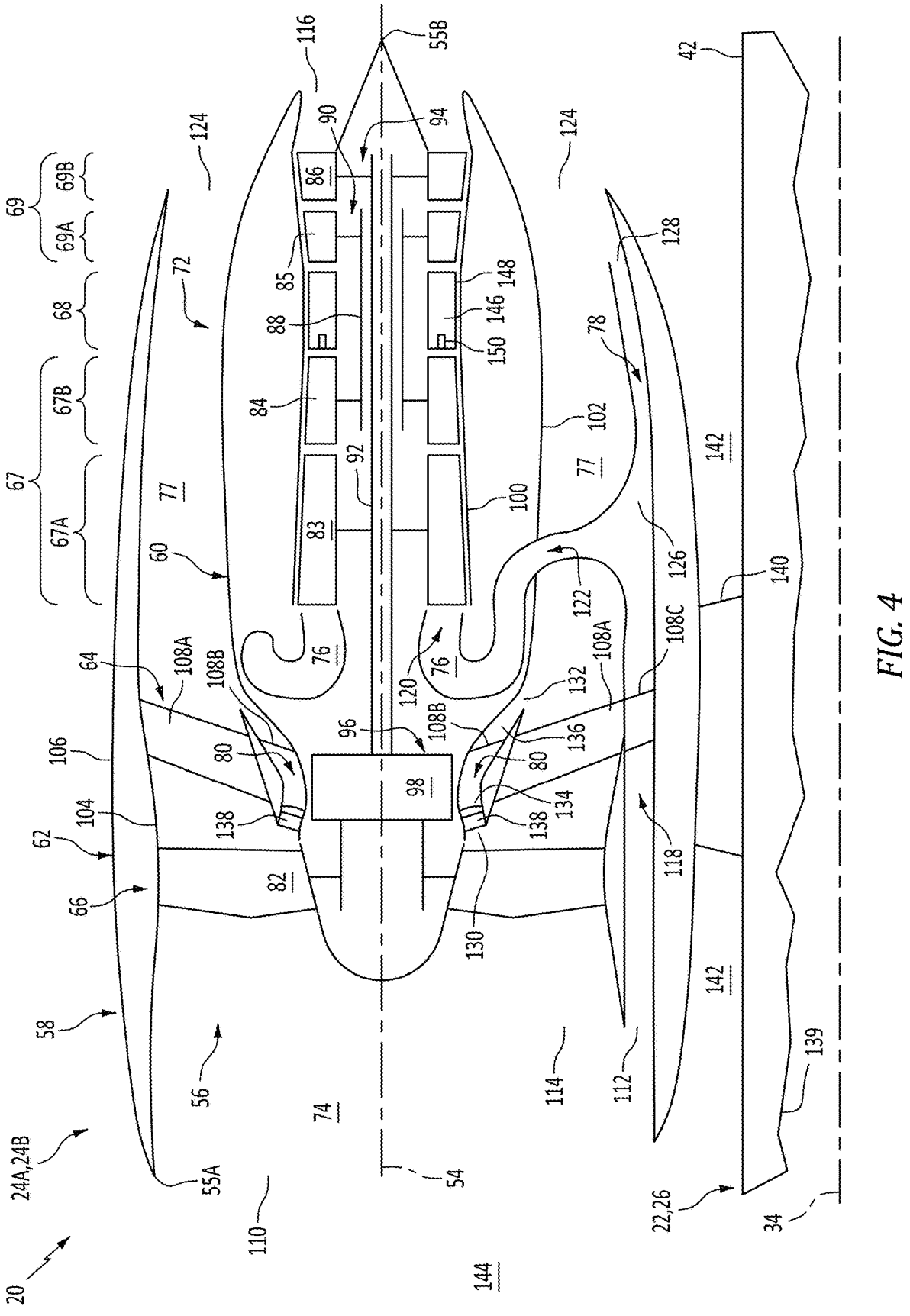
FIG. 4 is a schematic side sectional illustration of a propulsion system mounted to a portion of an airframe of the aircraft.

FIG. 4 illustrates an exemplary one of the aircraft propulsion systems 24A, 24B. This aircraft propulsion system 24 of FIG. 4 extends axially along an axis 54 of the aircraft propulsion system 24 from an upstream, forward end 55A of the aircraft propulsion system 24 to a downstream, aft end 55B of the aircraft propulsion system 24. Briefly, the propulsion system axis 54 may be a centerline axis of the aircraft propulsion system 24 and/or a centerline axis of one or more components of the aircraft propulsion system 24. The propulsion system axis 54 may also or alternatively be a rotational axis of one or more rotating components of the aircraft propulsion system 24. The aircraft propulsion system 24 of FIG. 4 includes a gas turbine engine 56 (e.g., a turbofan engine) housed within a stationary propulsion system housing 58. The propulsion system housing 58 includes an inner housing structure 60, an outer housing structure 62 and a guide vane structure 64; e.g., a fan exit guide vane (FEGV) structure.

The aircraft propulsion system 24 of FIG. 4 and its turbine engine 56 includes a fan section 66, a compressor section 67, a combustor section 68 and a turbine section 69. The compressor section 67 of FIG. 4 includes a low pressure compressor (LPC) section 67A and a high pressure compressor (HPC) section 67B. The turbine section 69 of FIG. 4 includes a high pressure turbine (HPT) section 69A and a low pressure turbine (LPT) section 69B. At least (or only) the LPC section 67A, the HPC section 67B, the combustor section 68, the HPT section 69A and the LPT section 69B may collectively form a core 72 (e.g., a gas generator) of the turbine engine 56. The aircraft propulsion system 24 of FIG. 4 and its turbine engine 56 also include an inlet flowpath 74, a core flowpath 76 and one or more bypass flowpaths, such as a propulsion bypass flowpath 77, an outer bypass flowpath 78 and an inner bypass flowpath 80.

The fan section 66, the LPC section 67A, the HPC section 67B, the combustor section 68, the HPT section 69A and the LPT section 69B may be arranged sequentially along the propulsion system axis 54 within the propulsion system housing 58. The fan section 66 includes a bladed fan rotor 82. The LPC section 67A includes a bladed low pressure compressor (LPC) rotor 83. The HPC section 67B includes a bladed high pressure compressor (HPC) rotor 84. The HPT section 69A includes a bladed high pressure turbine (HPT) rotor 85. The LPT section 69B includes a bladed low pressure turbine (LPT) rotor 86. Each of these engine rotors 82-86 includes a rotor base (e.g., a disk or a hub) and a plurality of rotor blades (e.g., airfoils, vanes, etc.). The rotor blades may be arranged into one or more stages axially along the respective engine rotor. The rotor blades in each stage are arranged and may be equispaced circumferentially around the respective rotor base in an annular array. Each of the rotor blades is connected to the respective rotor base. The rotor blades, for example, may be formed integral with or mechanically fastened, welded, brazed and/or otherwise attached to the respective rotor base. Each rotor blade of the fan rotor 82 projects spanwise (e.g., radially) out from the respective rotor base, across the propulsion bypass flowpath 77, to a distal tip of the respective rotor blade. Each rotor blade of each other engine rotor 83-86 projects spanwise (e.g., radially) out from the respective rotor base, across the core flowpath 76, to a distal tip of the respective rotor blade.

The HPC rotor 84 is coupled to and rotatable with the HPT rotor 85. The HPC rotor 84 of FIG. 4, for example, is connected to the HPT rotor 85 through a high speed shaft 88. At least (or only) the HPC rotor 84, the HPT rotor 85 and the high speed shaft 88 collectively form a high speed rotating structure 90; e.g., a high speed spool of the turbine engine 56 and its engine core 72. This high speed rotating structure 90 of FIG. 4 and its members 84, 85 and 88 are rotatable about the propulsion system axis 54. However, it is contemplated the high speed rotating structure 90 may alternatively be rotatable about another axis radially and/or angularly offset from the rotational axis of the propulsor rotor and/or the centerline axis of the turbine engine 56.

The LPC rotor 83 is coupled to and rotatable with the LPT rotor 86. The LPC rotor 83 of FIG. 1, for example, is connected to the LPT rotor 86 through a low speed shaft 92. At least (or only) the LPC rotor 83, the LPT rotor 86 and the low speed shaft 92 collectively form a low speed rotating structure 94; e.g., a low speed spool of the turbine engine 56 and its engine core 72. This low speed rotating structure 94 of FIG. 1 and its members 83, 86 and 92 are rotatable about the propulsion system axis 54. However, it is contemplated the low speed rotating structure 94 may alternatively be rotatable about another axis radially and/or angularly offset from the rotational axis of the propulsor rotor and/or the centerline axis of the turbine engine 56.

The low speed rotating structure 94 is coupled to the fan rotor 82 through a core-to-fan drivetrain 96. The core-to-fan drivetrain 96 may be configured as a geared drivetrain, where a geartrain 98 (e.g., a transmission, a speed change device, an epicyclic geartrain, etc.) is disposed between and operatively couples the fan rotor 82 to the low speed rotating structure 94 and its LPT rotor 86. With this arrangement, the fan rotor 82 may rotate at a different (e.g., slower) rotational speed than the low speed rotating structure 94 and its LPT rotor 86. Here, the fan rotor 82 and the low speed rotating structure 94 may rotate in a common (the same) direction about the propulsion system axis 54 or in opposite directions about the propulsion system axis 54 depending, for example, upon the specific configuration of the geartrain 98. Alternatively, the core-to-fan drivetrain 96 may be configured as a direct-drive drivetrain, where the geartrain 98 is omitted. With such an arrangement, the fan rotor 82 rotates at a common (the same) rotational speed as the low speed rotating structure 94 and its LPT rotor 86.

The inner housing structure 60 of FIG. 4 includes an inner case 100 (e.g., a core case) of the turbine engine 56 and an inner nacelle structure 102, which inner nacelle structure 102 may sometimes be referred to as an inner fixed structure (IFS). The inner case 100 is disposed radially outboard of, extends axially along and may circumscribe one or more or all of the engine sections 67A-69B and the engine rotors 83-86. The inner case 100 may thereby house and provide a support structure for the respective engine sections 67A-69B and the engine rotors 83-86. The inner nacelle structure 102 is configured to provide an aerodynamic cover over the engine core 72 and its inner case 100. The inner housing structure 60 and its inner nacelle structure 102 of FIG. 4 form a radial inner peripheral boundary of a longitudinal downstream section of the propulsion bypass flowpath 77.

The outer housing structure 62 of FIG. 1 includes an outer case 104 (e.g., a fan case) of the turbine engine 56 and an outer nacelle structure 106. The outer case 104 is disposed radially outboard of, extends axially along and may circumscribe the fan section 66 and its fan rotor 82. The outer case 104 may thereby house and may also be configured as a containment structure for the fan section 66 and its fan rotor 82. The outer nacelle structure 106 is configured to provide an aerodynamic cover over the outer case 104. The outer housing structure 62 and its outer nacelle structure 106 of FIG. 4 form a radial outer peripheral boundary of the propulsion bypass flowpath 77 as well as a radial outer peripheral boundary of the inlet flowpath 74.

The guide vane structure 64 includes a plurality of guide vanes 108A (e.g., structural guide vanes) arranged circumferentially about the propulsion system axis 54 in an array; e.g., an annular array. Each of these guide vanes 108A extends radially across the propulsion bypass flowpath 77 from the inner housing structure 60 to the outer housing structure 62. Each of the guide vanes 108A may also be connected to the inner housing structure 60 and the outer housing structure 62. The guide vanes 108A may thereby structurally tie the inner housing structure 60 and the outer housing structure 62 together. The guide vanes 108A may also or alternatively be configured to condition (e.g., de-swirl) propulsion bypass air propelled by the fan rotor 82 as described below in further detail. The guide vane structure 64 may also include one or more inner guide vanes 108B and/or one or more outer guide vanes 108C. The inner guide vanes 108B are disposed in the inner bypass flowpath 80. Each of these inner guide vanes 108B extends radially across the inner bypass flowpath 80 and may function as an inner structural extension of a respective one of the guide vanes 108A. The outer guide vanes 108C are disposed in the outer bypass flowpath 78. Each of these outer guide vanes 108C extends radially across the outer bypass flowpath 78 and may function as an outer structural extension of a respective one of the guide vanes 108A.

The inlet flowpath 74 projects longitudinally (e.g., axially along the propulsion system axis 54) into the aircraft propulsion system 24 and its turbine engine 56 from an airflow inlet 110 of the aircraft propulsion system 24. Within the aircraft propulsion system 24 and its propulsion system housing 58, the inlet flowpath 74 extends longitudinally along a radial inner side of the outer housing structure 62 from the propulsion system inlet 110 to an airflow inlet 112 into the core flowpath 76 and an airflow inlet 114 into the propulsion bypass flowpath 77. The propulsion system inlet 110 is disposed at the propulsion system forward end 55A. The core flowpath 76 and its core inlet 112 and the propulsion bypass flowpath 77 and its propulsion bypass inlet 114 are downstream of and fluidly coupled in parallel to the inlet flowpath 74. Here, the core inlet 112 and the propulsion bypass inlet 114 of FIG. 4 are axially aligned along the propulsion system axis 54. The present disclosure, however, is not limited to such an exemplary arrangement.

The core flowpath 76 extends longitudinally within the aircraft propulsion system 24 and its turbine engine 56 from the core inlet 112 to a combustion products exhaust 116 from the core flowpath 76. The core inlet 112 of FIG. 4 is disposed axially forward of the fan section 66 and its fan rotor 82 along the propulsion system axis 54. This core inlet 112 is also located radially outboard of the propulsion bypass flowpath 77. By contrast, the core exhaust 116 is disposed axially aft the of the engine core 72 and its LPT section 69B. The core exhaust 116, for example, may be disposed proximate the propulsion system aft end 55B. This core exhaust 116 is also located radially inboard of the inner housing structure 60 as well as the surrounding propulsion bypass flowpath 77. The core flowpath 76 of FIG. 4, for example, includes a longitudinal upstream section 118, a longitudinal downstream section 120 and a longitudinal intermediate section 122.

Figure 5:
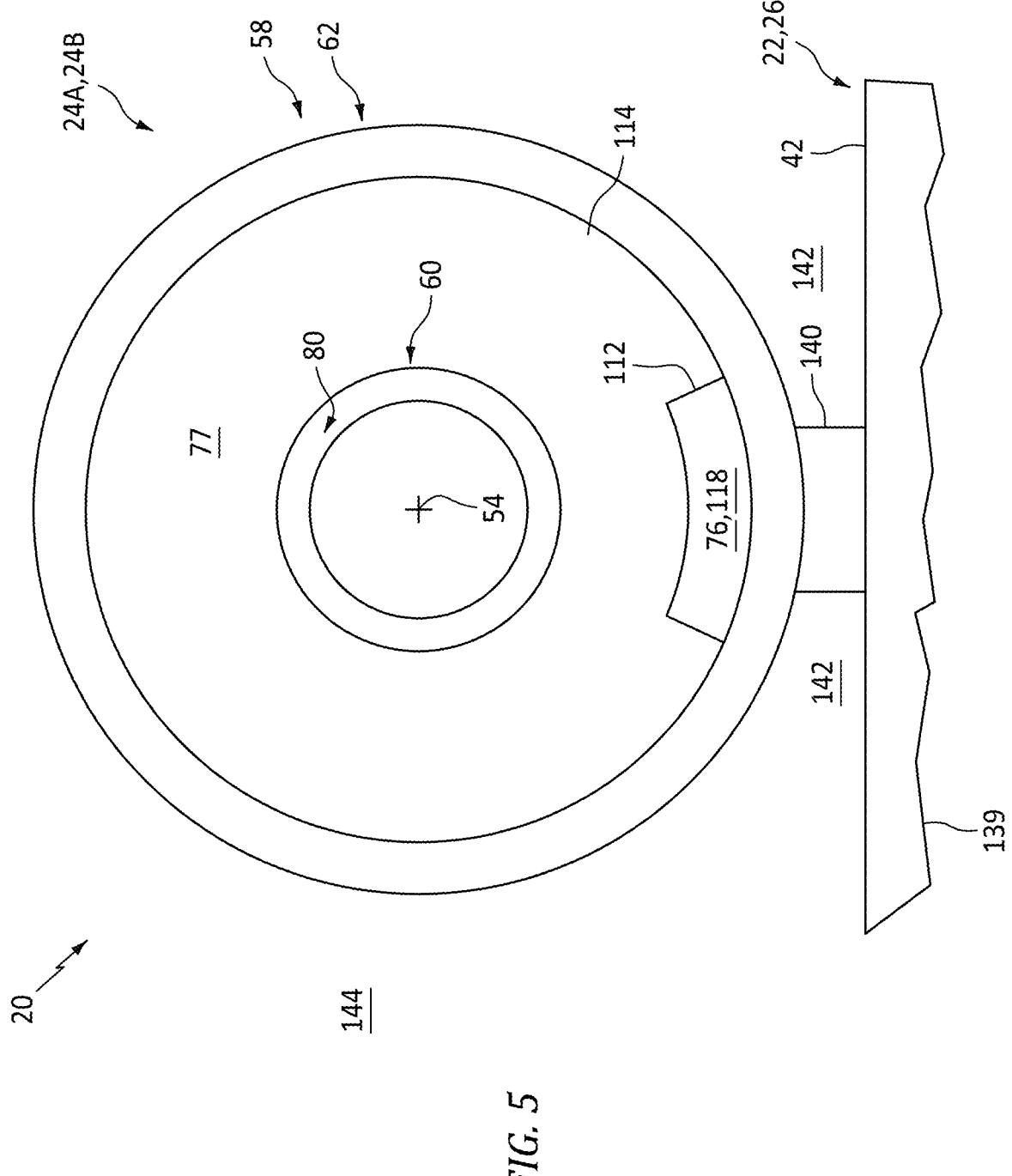
FIG. 5 is a schematic cross sectional illustration of the propulsion system mounted to a portion of the aircraft airframe.

The core upstream section 118 projects longitudinally from the core inlet 112 to an intersection with the core intermediate section 122. The core upstream section 118 is located radially outboard of and extends axially along the propulsion bypass flowpath 77 within the outer housing structure 62. The core upstream section 118 of FIG. 4 and the core inlet 112 may be disposed radially and vertically between (a) the propulsion system axis 54 and the propulsion bypass flowpath 77 and (b) the aircraft airframe 22 and the top side 42 of its aircraft body 26. Referring to FIG. 5, the core upstream section 118 and the core inlet 112 here are arranged at a bottom dead center (BDC) location circumferentially about the propulsion system axis 54 and in close vertical proximity to the aircraft airframe 22 and the top side 42 of its aircraft body 26. With such an arrangement, the core inlet 112 may receive lower momentum laminar flow through the inlet flowpath 74. The present disclosure, however, is not limited to such an exemplary arrangement. For example, referring to FIG. 6, the propulsion system axis 54 and the propulsion bypass flowpath 77 may alternatively be disposed radially and vertically between (a) the core upstream section 118 and the core inlet 112 and (b) the aircraft airframe 22 and the top side 42 of its aircraft body 26. Here, the core upstream section 118 and the core inlet 112 are arranged at a top dead center (TDC) location circumferentially about the propulsion system axis 54 and away from the aircraft airframe 22 and the top side 42 of its aircraft body 26.

Referring again to FIG. 4, the core downstream section 120 projects from an intersection with the core intermediate section 122 to the core exhaust 116. More particularly, the core downstream section 120 extends longitudinally through the engine core 72 and its engine sections 67A-69B from the core intermediate section 122 to the core exhaust 116. The core downstream section 120 is disposed radially inboard of and extends axially along the propulsion bypass flowpath 77 within the engine core 72 and radially inboard of the inner housing structure 60. This core downstream section 120 is annular and extends circumferentially about the propulsion system axis 54.

The core intermediate section 122 fluidly couples the core upstream section 118 to the core downstream section 120. The core intermediate section 122, for example, extends longitudinally from a downstream end of the core upstream section 118 to an upstream end of the core downstream section 120. This core intermediate section 122 also extends radially across the propulsion bypass flowpath 77 and radially into an interior of the inner housing structure 60 to the core downstream section 120. As the core intermediate section 122 extends longitudinally from the core upstream section 118 to the core downstream section 120, the core intermediate section 122 may follow a tortuous longitudinal trajectory. The trajectory of the core flowpath 76 and its core intermediate section 122 of FIG. 4, for example, axially reverses its direction one or more times upstream of the engine core 72 and its LPC section 67A. More particularly, the core intermediate section 122 and its trajectory of FIG. 4 may have an S-shaped geometry when viewed, for example, in a reference plane parallel with (e.g., including) the propulsion system axis 54. In some embodiments, one or more curves in the core intermediate section 122 may include particle separators, such as to remove particulates from the core flowpath 76 not ejected via the outer bypass flowpath 78 as discussed below.

The propulsion bypass flowpath 77 extends longitudinally (e.g., axially along the propulsion system axis 54) from the propulsion bypass inlet 114 to an airflow outlet 124 from the propulsion bypass flowpath 77. This propulsion bypass outlet 124 is disposed at an aft end of the outer housing structure 62. The propulsion bypass flowpath 77 of FIG. 4 is annular and extends circumferentially about the propulsion system axis 54 as well as the rotor base of the fan rotor 82 and the inner housing structure 60. With this arrangement, the propulsion bypass flowpath 77 extends longitudinally through the fan section 66, and the propulsor blades of the fan rotor 82 are disposed within the propulsion bypass flowpath 77. Moreover, the propulsion bypass flowpath 77 is fluidly discrete from the core flowpath 76 and bypasses the engine core 72 and its engine sections 67A-69B.

The outer bypass flowpath 78 extends longitudinally from an airflow inlet 126 into the outer bypass flowpath 78 to an airflow outlet 128 from the outer bypass flowpath 78. The outer bypass inlet 126 is fluidly coupled to the core flowpath 76, for example at the intersection between the core upstream section 118 and the core intermediate section 122. The outer bypass outlet 128 is fluidly coupled to the propulsion bypass flowpath 77, for example proximate to the propulsion bypass outlet 124. This outer bypass flowpath 78 and its outer bypass outlet 128 may be circumferentially aligned with the core upstream section 118 and the core inlet 112. The outer bypass flowpath 78 of FIG. 4 is located radially outboard of and extends axially along the propulsion bypass flowpath 77 within the outer housing structure 62. With this arrangement, the outer bypass flowpath 78 is fluidly coupled to the core flowpath 76 upstream of the engine core 72 and its LPC section 67A. The outer bypass flowpath 78 thereby bypasses the engine core 72 and provides a path for debris rejection. For example, relatively heavy debris carried into the core flowpath 76 may be directed out of the core flowpath 76 through the outer bypass flowpath 78 rather than turning radially into the core intermediate section 122.

The inner bypass flowpath 80 extends longitudinally from an airflow inlet 130 into the inner bypass flowpath 80 to an airflow outlet 132 from the inner bypass flowpath 80. The inner bypass inlet 130 is fluidly coupled to the propulsion bypass flowpath 77. This inner bypass inlet 130 may be disposed axially next to (or otherwise in close proximity to) and downstream and axially aft of the fan rotor 82. The inner bypass inlet 130 may also be disposed upstream and axially forward of the guide vane structure 64. The inner bypass outlet 132 is fluidly coupled to the propulsion bypass flowpath 77, downstream of the inner bypass inlet 130. This inner bypass outlet 132 may be disposed downstream and axially aft of the guide vane structure 64. The inner bypass flowpath 80 of FIG. 4 is located radially inboard of and extends axially along the propulsion bypass flowpath 77 within the inner housing structure 60. The inner bypass flowpath 80 of FIG. 4 thereby bypasses a longitudinal section of the propulsion bypass flowpath 77 with the guide vane structure 64. The inner bypass flowpath 80 is also fluidly discrete from the core flowpath 76.

The inner bypass flowpath 80 of FIG. 4 is annular and extends circumferentially about the propulsion system axis 54. When viewed in the reference plane (e.g., the plane of FIG. 4), an upstream section 134 of the inner bypass flowpath 80 may project (e.g., slightly) radially inward towards the propulsion system axis 54 as that inner bypass upstream section 134 extends longitudinally from the inner bypass inlet 130 to a downstream section 136 of the inner bypass flowpath 80. Still when viewed in the reference plane, the inner bypass downstream section 136 may project (e.g., slightly) radially outward away from the propulsion system axis 54 as that inner bypass downstream section 136 extends longitudinally from the inner bypass upstream section 134 to the inner bypass outlet 132.

The inner bypass flowpath 80 of FIG. 4 may also be configured with one or more vanes 138. These vanes 138 are arranged and may (or may not) be equispaced circumferentially about the propulsion system axis 54 in an array; e.g., an annular array. Each of the vanes 138 extends radially across the inner bypass flowpath 80. These vanes 138 may be configured as guide vanes operable to condition (e.g., de-swirl, or alternatively add swirl to) the air flowing through the inner bypass flowpath 80.

The aircraft propulsion system 24 of FIG. 4 is connected to a structure 139 of the aircraft airframe 22. This airframe structure 139 may include the aircraft body 26 and/or one or more of the aircraft wings 28 (see FIG. 1). The aircraft propulsion system 24 of FIG. 4 may also be located external to (e.g., outside of) the airframe structure 139 and its members 26 and 28. The aircraft propulsion system 24 of FIG. 4, for example, is disposed vertically above and is mounted (e.g., mechanically fixed) to the aircraft body 26 at (e.g., on, adjacent or proximate) the body top side 42 and, for example, the body aft end 38 (see FIG. 1). In particular, the aircraft propulsion system 24 of FIG. 4 is mounted to the aircraft body 26 by a pylon structure 140. This pylon structure 140 projects vertically out from the aircraft body 26 at the body top side 42 to a vertical bottom side of the aircraft propulsion system 24 and its propulsion system housing 58. With this arrangement, the aircraft propulsion system 24 of FIG. 4 and its outer housing structure 62 are radially and vertically spaced from the airframe structure 139 and its aircraft body 26 by an open external volume 142 (e.g., a top surface flow gully, a flow channel, etc.) which is external to the BWB aircraft 20. This external volume 142 is formed by and extends radially and vertically between the aircraft body 26 and the aircraft propulsion system 24 of FIG. 4 and its outer housing structure 62. The external volume 142 extends longitudinally along the aircraft propulsion system 24 from the propulsion system forward end 55A to the propulsion system aft end 55B. The external volume 142 of FIG. 4 may thereby completely bypass (e.g., extend around and outside of) the aircraft propulsion system 24 of FIG. 4. Referring to FIG. 5, the external volume 142 and the pylon structure 140 may each be circumferentially and/or axially aligned with (see also FIG. 4) and thereby circumferentially and/or axially overlap the core upstream section 118 and its core inlet 112. The present disclosure, however, is not limited to such an exemplary arrangement.

Referring to FIG. 1, the aircraft propulsion systems 24A and 24B are arranged to opposing lateral sides of the aircraft centerline 34 and, thus, a lateral center of the BWB aircraft 20 and its aircraft airframe 22. The first aircraft propulsion system 24A of FIG. 1, for example, is spaced laterally from the aircraft centerline 34 by a lateral first distance. The second aircraft propulsion system 24B of FIG. 1 is spaced laterally from the aircraft centerline 34 by a lateral second distance, which second distance may be equal to the first distance. The aircraft centerline 34 may thereby be arranged laterally midway between the aircraft propulsion systems 24.

During operation of the aircraft propulsion system 24 of FIG. 4, ambient air from an environment 144 external to the aircraft 20 and its aircraft propulsion system 24 enters the aircraft propulsion system 24 and its turbine engine 56 through the propulsion system inlet 110. More particularly, the air enters the inlet flowpath 74 through the propulsion system inlet 110. A minor portion (e.g., less than 50%) of the air flows from the inlet flowpath 74 into the core flowpath 76 through its core inlet 112 and may be referred to below as "core air". A major portion (e.g., more than 50%) of this air flows from the inlet flowpath 74 into the propulsion bypass flowpath 77 through the propulsion bypass inlet 114 and may be referred to below as "propulsion bypass air".

The core air flows through the core upstream section 118 to the intersection with the core intermediate section 122. At this intersection, a major portion of the core air turns radially inward and flows through the core intermediate section 122 and into the core downstream section 120. A minor portion of the core air, however, may be directed from the core flowpath 76, through into the outer bypass flowpath 78, and into the propulsion bypass flowpath 77 for exhausting into the external environment 144. With the outer bypass flowpath arrangement of FIG. 4, momentum of relatively heavy debris carried by the core air may propel that debris into the outer bypass flowpath 78 with the bled core air. The debris may thereby be removed from the core air before entering the engine core 72.

Within the engine core 72, the core air is compressed by the LPC rotor 83 and the HPC rotor 84 and is directed into a combustion chamber 146 (e.g., annular combustion chamber) of a combustor 148 (e.g., annular combustor) in the combustor section 68. Fuel is injected into the combustion chamber 146 by one or more fuel injectors 150 and mixed with the compressed core air to provide a fuel-air mixture. This fuel-air mixture is ignited and combustion products thereof flow through and sequentially drive rotation of the HPT rotor 85 and the LPT rotor 86. The rotation of the HPT rotor 85 and the LPT rotor 86 respectively drive rotation of the HPC rotor 84 and the LPC rotor 83 and, thus, the compression of the core air. The rotation of the LPT rotor 86 also drives rotation of the fan rotor 82 through the core-to-fan drivetrain 96.

The rotation of the fan rotor 82 propels the propulsion bypass air in an aft, downstream direction in the propulsion bypass flowpath 77. An inner portion of this propulsion bypass flowpath 77 is directed into the inner bypass flowpath 80 upstream of the guide vane structure 64 before being directed back into the propulsion bypass flowpath 77 downstream of the guide vane structure 64. This air directed through the inner bypass flowpath 80 thereby bypassing the section of the propulsion bypass flowpath 77 with the guide vane structure 64. The inner bypass flowpath 80 may also be configured to provide a pumping effect to stabilize disruptions in the propulsion bypass air caused by, for example, provision of the core inlet 112 asymmetrically to a side of the propulsion bypass flowpath 77; e.g., see FIG. 5. Here, roots of the rotor blades of the fan rotor 82 may be subject to different levels of pressure. Downstream of the inner bypass flowpath 80, the propulsion bypass air is directed out of the aircraft propulsion system through the propulsion bypass outlet 124 to provide forward thrust.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A system for an aircraft, comprising:

an airframe; and a propulsion system mounted to the airframe, the propulsion system extending axially along an axis from a forward end of the propulsion system to an aft end of the propulsion system, the propulsion system including a fan rotor, an engine core, an outer housing structure, an inner housing structure, a bypass flowpath and a core flowpath;

the fan rotor configured to propel air through the bypass flowpath;

the engine core configured to drive rotation of the fan rotor about the axis, and the engine core including a compressor section, a combustor section and a turbine section;

the outer housing structure housing the fan rotor and forming an outer peripheral boundary of the bypass flowpath;

the inner housing structure housing the engine core and forming an inner peripheral boundary of the bypass flowpath; and the core flowpath including a core inlet and a core exhaust, the core flowpath extending longitudinally through the compressor section, the combustor section and the turbine section from the core inlet to the core exhaust, and the core inlet located axially forward of the fan rotor and radially between the axis and the airframe.

2. The system of claim 1, further comprising:

a pylon structure mounting the propulsion system to the airframe;

the core inlet circumferentially aligned with the pylon structure.

3. The system of claim 1, wherein the propulsion system is spaced from the airframe by an open volume formed by an exterior surface of the airframe and an exterior surface of the outer housing structure; and the open volume axially and/or circumferentially overlaps the core inlet.

4. The system of claim 1, wherein an upstream section of the core flowpath projects longitudinally to the core inlet and is formed by the outer housing structure.

5. The system of claim 1, wherein the propulsion system further includes an inlet flowpath;

the inlet flowpath projects longitudinally into the propulsion system from an airflow inlet into the propulsion system at the forward end of the propulsion system; and the inlet flowpath is fluidly coupled with and upstream of the core inlet and an airflow inlet into the bypass flowpath.

6. The system of claim 1, wherein the propulsion system further includes an inlet flowpath; and the inlet flowpath projects longitudinally into the propulsion system to the core inlet and an airflow inlet into the bypass flowpath.

7. The system of claim 1, wherein the core flowpath includes an upstream section projecting longitudinally to the core inlet and disposed radially outboard of the bypass flowpath;

a downstream section projecting longitudinally to the core exhaust and disposed radially inboard of the bypass flowpath; and an intermediate section fluidly coupling the upstream section to the downstream section, and the intermediate section extending radially across the bypass flowpath.

8. The system of claim 1, wherein a trajectory of the core flowpath, longitudinally from the core inlet to the core exhaust, axially reverses direction one or more times upstream of the compressor section.

9. The system of claim 1, wherein the bypass flowpath is a first bypass flowpath;

the propulsion system further includes a second bypass flowpath; and an airflow inlet into the second bypass flowpath is fluidly coupled to the core flowpath upstream of the compressor section.

10. The system of claim 1, wherein the bypass flowpath is a first bypass flowpath;

the propulsion system further includes a second bypass flowpath; and an airflow inlet into the second bypass flowpath is fluidly coupled to the core flowpath at a location radially outboard of the first bypass flowpath.

11. The system of claim 1, wherein the bypass flowpath is a first bypass flowpath;

the propulsion system further includes a second bypass flowpath; and an airflow inlet into the second bypass flowpath is fluidly coupled to the core flowpath, and an airflow outlet from the second bypass flowpath is fluidly coupled to the first bypass flowpath.

12. The system of claim 1, wherein
the bypass flowpath is a first bypass flowpath;
the propulsion system further includes a second bypass flowpath; and
the second bypass flowpath is fluidly discrete from the core flowpath and disposed radially inboard of the first bypass flowpath.

13. The system of claim 1, wherein
the bypass flowpath is a first bypass flowpath;
the propulsion system further includes a second bypass flowpath; and
an airflow inlet into the second bypass flowpath and an airflow outlet from the second bypass flowpath are fluidly coupled to the first bypass flowpath.

14. The system of claim 1, wherein
the bypass flowpath is a first bypass flowpath;
the propulsion system further includes a second bypass flowpath and a plurality of vanes;
the second bypass flowpath is fluidly discrete from the core flowpath; and
the plurality of vanes are arranged circumferentially about the axis and extend radially across the second bypass flowpath.

15. The system of claim 1, wherein the airframe includes
a first wing;
a second wing; and
a fuselage disposed laterally between the first wing and the second wing;
the propulsion system mounted to the fuselage.

16. The system of claim 1, wherein the airframe is configured as a blended wing body airframe, and the propulsion system is mounted to a vertical top of the blended wing body airframe.

17. An aircraft system, comprising:
a propulsion system extending axially along an axis from a forward end of the propulsion system to an aft end of the propulsion system, the propulsion system including a fan rotor, an engine core, an outer housing structure, an inner housing structure, an inlet flowpath, a bypass flowpath and a core flowpath;
the fan rotor configured to propel air through the bypass flowpath;
the engine core configured to drive rotation of the fan rotor about the axis, and the engine core including a compressor section, a combustor section and a turbine section;
the outer housing structure housing the fan rotor, and the outer housing structure disposed radially outboard of and extending axially along the inlet flowpath and the bypass flowpath;
the inner housing structure housing the engine core, and the inner housing structure disposed radially inboard of and extending axially along the bypass flowpath;
the inlet flowpath projecting longitudinally into the propulsion system from an airflow inlet into the propulsion system, and the inlet flowpath fluidly coupled with and upstream of the bypass flowpath and the core flowpath; and
the core flowpath including a core inlet and a core exhaust, the core flowpath extending longitudinally through the compressor section, the combustor section and the turbine section from the core inlet to the core exhaust, and the core inlet located axially forward of the fan rotor.

18. The aircraft system of claim 17, further comprising:
a pylon structure projecting out from the propulsion system;
the core inlet disposed radially between the axis and the pylon structure.

19. The aircraft system of claim 17, further comprising:
a pylon structure projecting out from the propulsion system;
the axis disposed radially between the core inlet and the pylon structure.

* * * * *